Patented June 21, 1927.

1,633,539

UNITED STATES PATENT OFFICE.

WILLIAM R. MILLER, OF MEDFORD, AND ISRAEL GORDON, OF MALDEN, MASSACHUSETTS.

CONNECTING LINK.

Application filed January 21, 1927. Serial No. 162,616.

Our invention relates to connecting links for chains, and is specially useful in connection with tire chains, where it may be used to great advantage on each end of the cross-chains.

The object of the invention is to provide a link having means at each end for quickly and conveniently attaching the same to another link or for detaching the same therefrom.

A further object is to provide a device of this character which in an emergency may be made to take the place of a broken link at any point between the ends of a chain, being specially useful for mending cross chains when a link has become worn out and broken.

Other objects will appear in the subjoined description.

A leading feature of the invention consists in a link having an opening at each end provided with a yielding closure arranged to permit a link to be snapped thereinto; and further provided with special means for preventing the accidental disengagement of the link therefrom; the connecting link as a whole being specially arranged to prevent wear at the central portion thereof where the yielding element is rigidly secured.

The invention consists in certain novel features of construction and arrangement of parts, as will be hereinafter described and claimed, reference being had to the accompanying drawings in which;—

Fig. 1 is a view showing a cross chain provided at each end with one of our improved connecting links for engagement with the side chains of an automobile tire.

Fig. 2 is a side elevation on an enlarged scale, of one of our connecting links; and, Fig. 3 is a side elevation on a still larger scale, of the spring element of our device.

Referring further to the drawings, the numeral 1 indicates a cross chain provided at each end with one of our connecting links 2, for connecting the cross chain with the side chains 3. The connecting link 2 is formed somewhat in the form of the numeral 3, having each end formed into a loop or hook 4, and the intermediate connecting portion 5 bent inwardly at its centre sufficiently to bring its outer side preferably to the longitudinal centre of the device as indicated at 6.

The opposite side of the device intermediate the two links is closed by a spring 7, which is rigidly secured midway between its ends to the inner side of the inwardly bent section 6 of the link. This connection may be made by means of a rivet 8, or in any other preferred way, the two parts 5 and 7 having suitable bores for the connecting means employed. The ends of the spring 7 lap the terminals 4ª of the loops 4 on the inner sides of said terminals; and the lapping portions 9 of this spring are shaped to conform nicely to the shape of the terminals, so that when a link when engaged by one of the loops or hooks 4 cannot possibly work its way accidentally between the end of the spring and loop terminal.

In operation, the link to be inserted in one of the loops 4 is simply pressed inwardly against the inclined face 10 at the free end of the loop, which wedges the link inwardly between said end of the loop and the cooperating end of the spring and thus permits the link to enter the loop.

It will be seen that this device is specially adapted for use with tire chains, since the cross chains 1 always wear out in the middle where they are subjected to constant contact with the street or roadway. When an ordinary cross chain is worn in two in the middle, tools are usually necessary to disconnect the ends of the chain from the side chains; but with our device the ends are simply unsnapped; and then the connecting links 2 are next unsnapped from the pieces of the cross chain, and are ready to be used again.

Disconnecting the broken ends of an ordinary cross chain from the side chains is sufficiently inconvenient to cause automobile drivers when in a hurry to leave the broken pieces on; and thus it is that we often hear a machine going swiftly down the street with the ends of a broken cross chain whipping the fender at every revolution of the wheel, in a most disagreeable manner. This is undesirable not only because of the noise and possible damage to the fender, but also because the service of a good chain instead of a broken chain may be needed to keep the automobile from skidding. With our device a broken chain can be replaced so quickly and conveniently that no broken cross chain need ever to be left on a tire to whip and thrash and clatter against the fender.

Again, when a driver has a cross chain

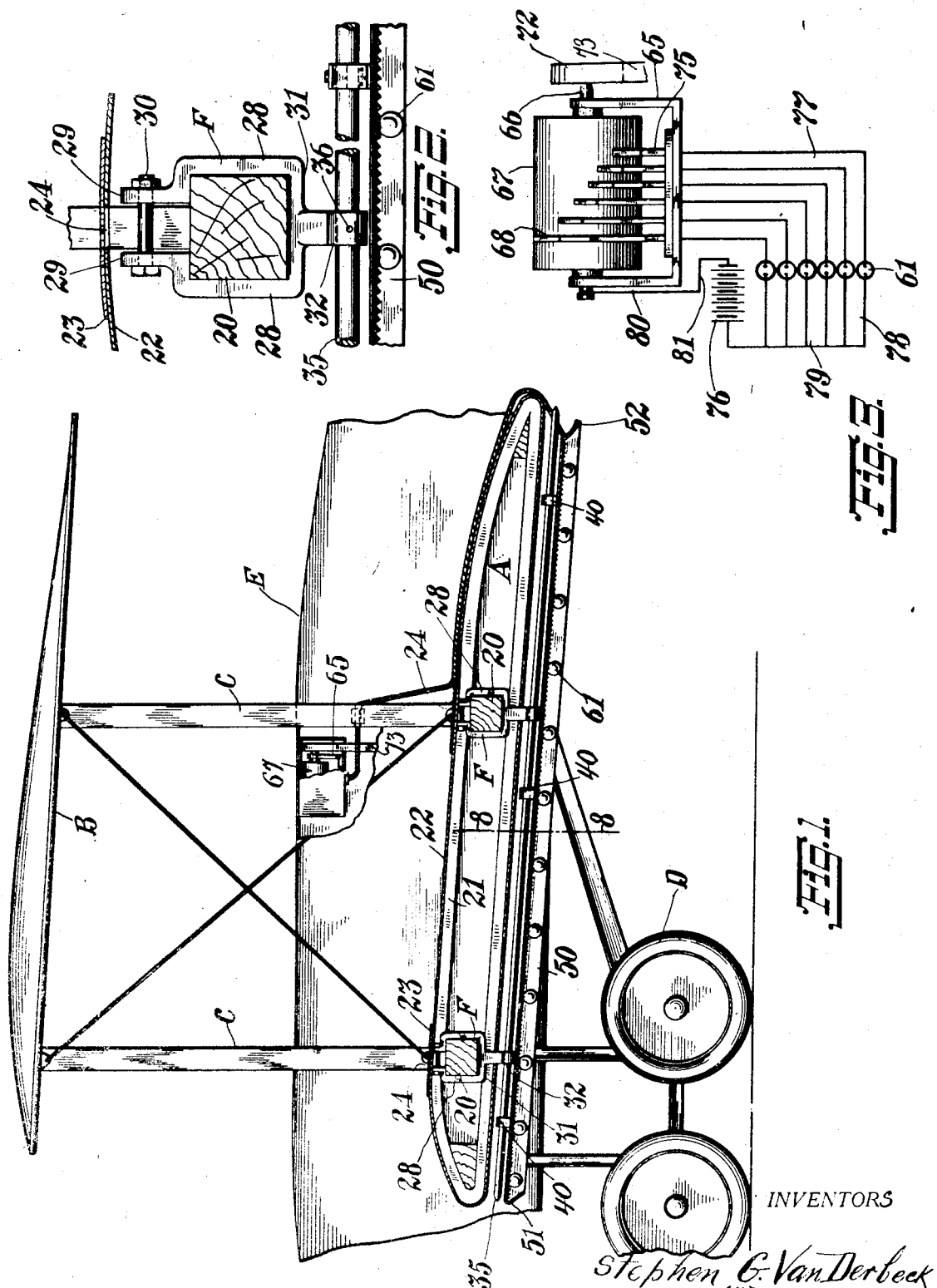
June 21, 1927.
S. G. VAN DERBECK ET AL
1,633,540
AERIAL ILLUMINATING DEVICE
Filed July 31, 1923    2 Sheets-Sheet 1
INVENTORS
Stephen G. Van Derbeck
AND
Joseph Bortolin
By Aide Bonneville ATTORNEY